(12) United States Patent
Mottin et al.

(10) Patent No.: US 10,134,152 B2
(45) Date of Patent: Nov. 20, 2018

(54) METHOD AND SYSTEM FOR DETERMINING CELLS TRAVERSED BY A MEASURING OR VISUALIZATION AXIS

(71) Applicant: COMMISSARIAT A L'ÉNERGIE ATOMIQUE ET AUX ÉNERGIES ALTERNATIVES, Paris (FR)

(72) Inventors: Julien Mottin, Saint-Ismier (FR); Tiana Rakotovao Andriamahefa, Grenoble (FR); Diego Puschini Pascual, Meylan (FR); Olivier Debicki, Saint-Vincent-De-Mercuze (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/611,453

(22) Filed: Jun. 1, 2017

(65) Prior Publication Data

US 2017/0352163 A1    Dec. 7, 2017

(30) Foreign Application Priority Data

Jun. 3, 2016   (FR) ..................... 16 55104

(51) Int. Cl.
*G06T 7/70* (2017.01)
*G05D 1/00* (2006.01)
(Continued)

(52) U.S. Cl.
CPC ............... *G06T 7/70* (2017.01); *G05D 1/00* (2013.01); *G06F 17/10* (2013.01);
(Continued)

(58) Field of Classification Search
CPC ..... G06T 7/70; G06K 9/00805; G01S 17/936; G01S 15/931; G01S 13/931
(Continued)

(56) References Cited

U.S. PATENT DOCUMENTS

2004/0227964 A1* 11/2004 Fujino ................ H04N 1/6075
358/1.9
2007/0121180 A1*  5/2007 Ogawa ..................... H04N 1/62
358/1.9

FOREIGN PATENT DOCUMENTS

FR    3 041 451 A1    3/2017
WO    2013/189482 A1  12/2013

OTHER PUBLICATIONS

Mel Slater, "Tracing a ray through uniformly subdivided n-dimensional space," The Visual Computer, Jan. 1, 1992, XP055346587.
(Continued)

*Primary Examiner* — Gregory F Cunningham
(74) *Attorney, Agent, or Firm* — Baker & Hostetler LLP

(57) ABSTRACT

A method to locate material bodies on an at least 2-dimensional occupancy grid G, having a first resolution stepsize $R_G$, that includes a set of cells represented by vertices and segments connecting these vertices. The method uses a sensor for detecting an obstacle which is positioned at source point S, and includes at least the following steps: acquisition by the sensor of a measurement of the position of a material body detected at a point F; defining the coordinates of a point M by using a space discretized with the aid of a spatial stepsize δ which is finer than the resolution stepsize $R_G$, initializing an integer, error parameter, and calculating the value of the error parameter for at least one first vertex of the cell of the current grid.

15 Claims, 10 Drawing Sheets

(51) Int. Cl.
- *G06F 17/10* (2006.01)
- *G06K 9/00* (2006.01)
- *G01S 13/93* (2006.01)
- *G01S 15/93* (2006.01)
- *G01S 17/93* (2006.01)

(52) U.S. Cl.
CPC ........ *G06K 9/00805* (2013.01); *G01S 13/931* (2013.01); *G01S 15/931* (2013.01); *G01S 17/936* (2013.01)

(58) Field of Classification Search
USPC .......................................................... 382/106
See application file for complete search history.

(56) References Cited

OTHER PUBLICATIONS

Y. K. Liu et al., "A General Multi-step Algorithm for Voxel Traversing Along a Line," Computer Graphics forum Volume, Oct. 31, 2007, pp. 73-80, XP055346809.

Y. K. Liu et al., "An Integer One-Pass Algorithm for Voxel Traversal," Computer Graphics Forum, vol. 23, No. 2, Jun. 1, 2004, pp. 167-172, XP055346815.

Cleary et al., "Analysis of an algorithm for fast ray tracing using uniform space subdivision," Visual Computer, vol. 4, No. 2, Jan. 1, 1988, pp. 65-83, XP008121704.

Tiana Rakotovao et al., "Integration of multi-sensor occupancy grids into automotive EUCs," Proceedings of the 53rd Annual Design Automation Conference, Jun. 5, 2016, pp. 1-6, XP058259044.

John Amanatides et al., "A Fast Voxel Traversal Algorithm for Ray Tracing," Eurographics, 1987.

A. Hornung et al., "OctoMap: an efficient probabilistic 3D mapping framework based on octrees," Autonomous Robots, vol. 34, 2013, pp. 189-206.

Gutmann et al., "A Floor and Obstacle Height Map for 3D Navigation of a Humanoid Robot," Proceedings of the 2005 IEEE International Conference on Robotics and Automation, Apr. 2005, pp. 1066-1071.

\* cited by examiner d=1 d=2 d=3 d=4 d=5 d=6

METHOD AND SYSTEM FOR DETERMINING CELLS TRAVERSED BY A MEASURING OR VISUALIZATION AXIS

CROSS-REFERENCE TO RELATED APPLICATION

This application claims priority to foreign French patent application No. FR 1655104, filed on Jun. 3, 2016, the disclosure of which is incorporated by reference in its entirety.

FIELD OF THE INVENTION

The invention relates to a method and a system for determining cells situated on an axis or a path between a first source point and a second point.

The invention applies in electronic perception systems for aiding navigation. Devices of this type are used in the automotive, robotics, drone sectors and in automated production lines, etc., with the aim in particular of detecting and determining the position of a material body liable to be situated on the trajectory of a moving device.

BACKGROUND

By "material body" is meant any material substance or object exhibiting an individuality and able to be detected and identified by an appropriate sensor. Thus, inanimate objects, be they natural or artificial, plants, animals, human beings are considered to be material bodies, as are also liquid or solid particles in suspension in the air, such as clouds, or indeed liquid or gaseous masses.

The invention can also be used in the image reconstruction field, in order to determine the information to be used to reconstruct an image in a given direction of vision, for example along a sensor's axis of observation or vision.

In the object perception sector, two main families of perception technique exist: geometric schemes, which are aimed at identifying the geometry of the objects of the surrounding space, and occupancy grid based schemes, which are aimed at determining whether a certain site is occupied by an obstacle, more generally by a material body. The invention pertains to occupancy grid based techniques.

To capture and interpret the environment, the perception system employs distance sensors which advise as regards the remoteness of the obstacles in the vicinity. These distance sensors can conventionally be: radars, ultrasound sensors, 3D imagers, stereovision systems, LIDARs (Light Detection And Ranging), etc. To improve the robustness of the perception function and to increase the overall field of vision, the system incorporates several heterogeneous sensors. One of the difficulties is to determine, precisely and in a reasonable computation time, the cells liable to be traversed or observed by a moving device so as to associate with them an item of information relating to the presence or to the absence of an obstacle. The constraints encountered are mainly of two kinds, computational need and memory need.

An occupancy grid is a partition of the observed space into cells. For each cell, its state is sought. For example, two issues may be possible, "occupied" or "empty. The certainty level regarding the occupancy of a cell is then given, for example, with the probability of the event "O=occupied" denoted P(O) and with the complementary P(e)=1−P(O). In other applications, a value or a parameter encoding the knowledge of another spatial magnitude, such as the air pollution, or the temperature of a zone, may be associated with a cell. The probabilities of occupancy are, for example, estimated on the basis of the knowledge, provided by the sensors, of the exterior environment.

The example given in FIG. 1 represents the implementation of the framework of the occupancy grids for a vehicle 1 equipped with a distance sensor 2 with the aid of a regular grid G. Each cell of this grid represents a fragment of the space situated in front of the vehicle, and for each cell the probability of occupancy is computed. A value of greater than 0.5 indicates a higher certainty that the cell in question is occupied. Conversely, a value of less than 0.5 indicates that the cell has more chance of being free. The probability equal to 0.5 indicates that no relevant information is available to pronounce upon the state of the cell.

As a function of the applications, it may be critical to determine the occupied cells (obstacle trajectory analysis, target following, etc.) or the empty cells (displacement planning, avoidance, etc.). The advantage of the framework of the occupancy grids is that with a single modeling of the environment that is rather simple, both types of information are represented.

In FIG. 2, a 1D sensor model is used for the evaluation of the occupancy of a cell. This sensor model known to the person skilled in the art allows the evaluation of the occupancy in a 1D grid represented on the left of FIG. 2. The 1D occupancy information is thereafter mapped into a 2D model, right part of FIG. 2. This requires firstly positioning the sensor S in the grid, and then the target F, and determining all the cells traversed by the half-line [SF] in the grid. When several sensors are used, for each of the cells the information is then merged with that of the other sensors having relevant information for the cell in question. In 1D or in 2D, the cells whose occupancy information (probability of occupancy, for example) has to be updated are situated between S and F and also beyond F, this being because of the uncertainty related to the sensor's measurement precision.

One of the problems in the computation of 2D or 3D occupancy grids, when using several heterogeneous sensors positioned at various sites of the space studied, is that the computational need explodes. Indeed, for each measurement the 1D occupancy profile corresponding to a cell is computed, and then this 1D profile is mapped and merged in a grid of larger dimension. The magnitudes manipulated are generally probabilities and distances, traditionally expressed with the aid of real numbers. Most of the time these real numbers are represented with the aid of floating-point numbers which require the digital system to be capable of supporting floating-point arithmetical operations. Moreover, and independently of any digital representation, the mapping problem is intrinsically tricky since it implements computation utilizing information at various spatial resolutions. Indeed, the position of the sensors and their responses are, most of the time, known to spatial resolutions greater than that of the grid. The representation of the distances with the aid of floating-point numbers is then often used, since it makes it possible to dispense in the computation with considerations regarding the precision of the spatial information.

Various schemes are known from the prior art for determining occupied cells in grids and also for the way of obtaining the information advising a cell.

The document entitled "A Fast Voxel Traversal Algorithm for Ray Tracing" by A. W. John Amanatides, Eurographics, 1987, discloses a line tracing algorithm in a 2D or 3D environment. This algorithm consists in traveling over the 2D or 3D parametric straight line equation and in collecting the set of cells traversed. This algorithm nonetheless requires a floating-point operation at each iteration (switch to the next cell).

The document by A. Hornung, K. M. Wurm, M. Bennewitz, C. Stachniss, and W. Burgard entitled "OctoMap: an efficient probabilistic 3D mapping framework based on octrees" published in Autonomous Robots, 2013, describes a scheme for representing three-dimensional occupancy grids. The general framework allows the continuous incorporation of information of sensors and describes how the sensory information is mapped in the environment. The scheme then utilizes the aforementioned work by Amanatides to map the environment information.

The algorithm described in the document by J. E. Bresenham entitled "Algorithm for computer control of a digital plotter", IBM Systems Journal, 1965, makes it possible to plot a line on a screen. The objective of the algorithm is to be ultra-efficacious, and to give a result which is satisfying to the eye. From a mathematical point of view, the principle consists in determining all the pixels (~cells) traversed by a line (~sensor measurement). This algorithm requires only integer operations with neither multiplication nor division. On the other hand, certain pixels traversed by the line will not be displayed, and certain displayed pixels are not mathematically traversed by the line.

The applicant's patent application FR1558919 describes a scheme making it possible to carry out the fusion of the occupancy information at the level of a cell. This technique makes it possible to construct the result of the fusion by means of arithmetical operations alone. On the other hand, the scheme does not describe how to solve the problem of the mapping of the 2D or 3D information in integer arithmetic.

In patent application WO2013189482, a representation of the occupancy grids with the aid of quadtree is proposed. The use of quadtrees for 2D occupancy grids for automotive applications is motivated for two reasons mainly:

The sensors do not necessarily work at the same resolutions, and it may be judicious to have a hierarchical data structure which allows multi-resolution information processing, The applications do not necessarily utilize information at the same resolution (emergency braking, vs navigation for example).

The technical difficulty solved by this scheme makes it possible to construct an item of information of lower resolution from an item of information of smaller resolution. It does not describe how the mapping of the information is carried out, at whatever resolution it be.

It is therefore important to have available a scheme making it possible to determine, simply and with a small number of computational resources, the coordinates of the cells whose occupancy probability value, or a value representative of the content of the cell traversed, it is desired to update.

In the subsequent description, the expression "cell traversed" designates a cell which is traversed or observed by the field of vision of a sensor or of an observer.

An error function Err( ) is defined as a function which makes it possible to compute an error value representative of the position of at least one coordinate of a point belonging to an occupancy grid with respect to a path defined in an observation space. Examples will be given hereinafter.

SUMMARY OF THE INVENTION

For this purpose, the invention is aimed at providing a scheme for determining the cells requiring fewer resources than the schemes proposed in the prior art. The invention also makes it possible to optimize the phase of mapping the information regarding occupancy in a grid, whatever its dimension, 1D, 2D, 3D, etc., so as to render it much less constraining for the computational architecture and faster, while ensuring precision with respect to traditional floating-point approaches.

The invention relates to a method for perceiving material bodies, which is intended to locate said bodies on an at least 2-dimensional occupancy grid G, having a first resolution stepsize $R_G$, and comprising a set of cells represented by vertices and segments connecting these vertices, the method using a sensor for detecting obstacles which is positioned at source point S and comprising the following steps:

Acquisition by said sensor of a measurement of the position of a material body detected at a point F;

Definition of the coordinates of the points S and F in a space discretized with the aid of a spatial stepsize $\delta$, the spatial stepsize $\delta$ being smaller than the resolution stepsize $R_G$ of the grid G, the size of the cells being defined by size(c)=r·$\delta$, r∈ℕ, a point M with coordinates (l,m) in this discretized space being situated in the continuous space at the point (x,y), where $x = l \cdot \delta$ $y = m \cdot \delta$ the points S and F having respectively coordinates $(l_S, m_S)$ and $(l_F, m_F)$; Determination of the cell $c_s$ of the occupancy grid G containing the point S;

Determination of the coordinates, in the discretized space, of an initial vertex V0 of the cell $c_s$;

Computation of the value of an, integer, error parameter E by using an error function $Err_d(M)$ making it possible to evaluate, in the discretized space, an offset between a point of the space and a straight line connecting the points S and F, said error parameter E being initialized to the value taken by said error function for said initial vertex V0 of the cell $c_s$, Computation of the value of said error parameter E for at least one first vertex $V1_i$ of the current cell $c_i$ of the grid in the course of observation, corresponding to $Err_d(V1_i)$, this computation consisting in carrying out an addition or subtraction operation between integer numbers, between on the one hand said value of the parameter E, obtained for the initial vertex $V0_i$ of the current cell $c_i$, and corresponding to $Err_d(V0_i)$, and on the other hand an integer increment value ($\Delta$) predefined as a function of the coordinates of the points S and F in the discretized space, Studying the previously computed value of the error parameter E with respect to a reference value and determining a following cell $c_{i+1}$ situated in proximity to the path [SF];

Computing, if necessary, the value of said error parameter E for an initial vertex $V0_{i+1}$ of the following cell $c_{i+1}$, corresponding to $Err_d(V0_{i+1})$, this computation consisting in carrying out an addition or subtraction operation between integer numbers, between on the one hand said value of the parameter E, obtained for at least one vertex $V_i$ of the current cell $c_i$, and corresponding to $Err_d(V_i)$, and on the other hand an integer increment value ($\Delta$) predefined as a function of the coordinates of the points S and F in the discretized space, Using this following cell $c_{i+1}$ and said value of the error parameter E, obtained for said initial vertex $V0_{i+1}$ of this cell, as starting point and repeating steps f to h until at least the cell $c_F$ containing the final point F is reached, Determining the list $\{c_i\}$ of cells considered in the previous steps and situated on the path [SF] or situated a predefined distance from the path [SF] and updating said occupancy grid G for the listed cells.

The material body or the object can be an obstacle situated on the path, the cells are then filled by an occupancy probability value. The object can be an image that it is desired to reconstruct and the cell will be filled by a parameter representative of the image in the sensor's field of vision.

According to a variant embodiment of the above-mentioned method, in the course of step f, a value of said error parameter E, corresponding to Errd(V), is computed for each "additional" vertex V of the current cell ci, other than the initial vertex, this computation consisting in carrying out an addition or subtraction operation between integer numbers, between on the one hand said value of the parameter E, obtained for the initial vertex V0i of the current cell ci, and corresponding to Errd(V0i), and on the other hand an integer increment value ($\Delta$) predefined as a function of the coordinates of the points S and F in the discretized space, and, in the course of step g, the following steps are performed:

a search is conducted to investigate whether one of the values of said error parameter E, obtained for the additional vertices, is zero for an identified vertex and, in the affirmative, this vertex is subsequently considered to be the initial vertex of the following cell $c_{i+1}$, the error parameter E corresponding to this new initial vertex being equal to that computed previously for said identified vertex;

and in the negative, a search is conducted for a side, or a face, of the current cell ci defined by additional vertices associated with values of the parameter E of opposite signs, said following cell $c_{i+1}$ then being the cell adjacent to the current cell $c_i$ sharing the same side, one of the additional vertices belonging to this common side then being considered to be the initial vertex of the following cell $c_{i+1}$, the error parameter E corresponding to this new initial vertex being equal to that computed previously for this said vertex;

and in which the list $\{c_i\}$ of the cells defined in step j corresponds to the cells traversed by the straight line segment between the points S and F.

According to a variant embodiment of the above-mentioned method, the occupancy grid is defined in 2 dimensions and the error function $Err_d(M)$ is defined by:

$$Err_d(M)=(m-m_s)\cdot(l_F-l_s)-(l-l_s)\cdot(m_F-m_s).$$

and in which, in the course of step f, a value of the error parameter is computed for each "additional" vertex V of the current cell ci, other than the initial vertex V0, and designated $V_l$, $V_m$ and $V_{lm}$, $V_{lm}$ being the vertex opposite to the initial vertex, according to the following operations:

$$Err_d(V_l)=Err_d(V)-\Delta m$$

$$Err_d(V_m)=Err_d(V)+\Delta l$$

$$Err_d(V_{lm})=Err_d(V_l)+\Delta l$$

Where $\Delta l=r\cdot(l_F-l_S)$ and $\Delta m=r\cdot(m_F-m_S)$

According to a variant embodiment of the above-mentioned method, during step g, by comparing the sign of the computed errors, the next cell traversed is determined in the following manner:

If $Err_d(V_{lm})=0$, then the cell ci+1 corresponds to the cell having an initial vertex corresponding to $V_{lm}$ and the error parameter E associated with this new initial vertex is equal to $Err_d(V_{lm})$, If $Err_d(V_{lm})$ and $Err_d(V_l)$ are of opposite signs, then the cell ci+1 corresponds to the cell having an initial vertex corresponding to $V_l$ and the error parameter E associated with this new initial vertex is equal to $Err_d(V_l)$, Otherwise the cell $c_{i+1}$ corresponds to the cell having an initial vertex corresponding to $V_{lm}$ and the error parameter E associated with this new initial vertex is equal to $Err_d(V_m)$.

According to a variant embodiment of the above-mentioned method, the occupancy grid is defined in 3 dimensions and the error function $Err_d(M)$ is defined for a point M(l, m, n) in integer coordinates in the following manner:

$$Err_{d\_xy}(M)=(m-m_s)\cdot(l_F-l_s)-(l-l_s)\cdot(m_F-m_s)$$

$$Err_{d\_yz}(M)=(n-n_s)\cdot(m_F-m_s)-(m-m_s)\cdot(n_F-n_s)$$

$$Err_{d\_xz}(M)=(l-l_s)\cdot(n_F-n_s)-(n-n_s)\cdot(l_F-l_s)$$

and, in the course of step f, a value of the error parameter is computed for each "additional" vertex V of the current cell ci, other than the initial vertex V0, and designated $V_l$, $V_m$, $V_n$, $V_{lm}$, $V_{ln}$, $V_{mn}$, $V_{lmn}$, $V_{lmn}$ being the vertex of a three-dimensional cell, opposite to the initial vertex, according to the following operations:

$$Err_{d\_xy}(V_l)=Err_{d\_xy}(V)-\Delta m$$

$$Err_{d\_xy}(V_m)=Err_{d\_xy}(V)+\Delta l$$

$$Err_{d\_xy}(V_{lm})=Err_{d\_xy}(V_l)+\Delta l$$

$$Err_{d\_yz}(V_m)=Err_{d\_yz}(V)-\Delta n$$

$$Err_{d\_yz}(V_n)=Err_{d\_yz}(V)+\Delta m$$

$$Err_{d\_yz}(V_{mn})=Err_{d\_yz}(V_m)+\Delta m$$

$$Err_{d\_xz}(V_n)=Err_{d\_xz}(V)-\Delta l$$

$$Err_{d\_xz}(V_l)=Err_{d\_xz}(V)+\Delta n$$

$$Err_{d\_xz}(V_{ln})=Err_{d\_xz}(V_n)+\Delta n$$

Where $\Delta l=r\cdot(l_F-l_s)$, $\Delta m=r\cdot(m_F-m_s)$ and $\Delta n=r\cdot(n_F-n_s)$ According to a variant embodiment of the above-mentioned method, in the course of step j, the listed cells correspond to the cells for which one of their vertices is associated with an error parameter value lying between a predefined minimum error value ($e_{min}$) and a predefined maximum error value ($e_{max}$).

According to a variant embodiment of the above-mentioned method, the values of minimum and maximum error are dependent, for a given cell, on the distance between the initial vertex of this cell and said vertex S.

According to a variant embodiment of the above-mentioned method, the coordinates of a point M in the discretized space are represented, on each axis of a frame, by an integer defined by a binary word of W bits, and in which a point M belongs to a cell of the occupancy grid, each cell being defined, for each axis of the frame by an integer index defined by a binary word of d bits, and in which W is greater than d and in which W and d are chosen such that $$d < W \le \frac{T+d-1}{2}$$

With T corresponding to the maximum number of bits that can be manipulated by an integer arithmetic unit used for the implementation of a multiplication operation to carry out said computation (404) of the value of an error parameter E, in step e.

According to a variant embodiment of the above-mentioned method, the coordinates of a point M in the discretized space are represented, on each axis of a frame, by an integer defined by a binary word of W bits, and the integer coordinates ($u_x$, $u_y$, $u_z$) of a point M are determined on the basis of spherical coordinates by computing the offset at the center of the frame K $$u_x - u_x^K = D \cdot T_x(\alpha, \omega)$$

$$u_y - u_y^K = D \cdot T_y(\alpha, \omega)$$

$$u_z - u_z^K = D \cdot T_z(\omega)$$

with D the distance of the target, $\alpha$ the longitude measured on the basis of the axis x, $\omega$ the latitude measured from the equatorial plane,
and $T_x(\alpha, \omega)$, $T_y(\alpha, \omega)$ and $T_z(\omega)$ are precomputed tables of stored integer values (105) defined by:

$$T_x(\alpha, \omega) = \frac{2^{W-1} \cdot \cos(\omega) \cdot \cos(\alpha)}{R}$$

$$T_y(\alpha, \omega) = \frac{2^{W-1} \cdot \cos(\omega) \cdot \sin(\alpha)}{R}$$

$$T_z(\omega) = \frac{2^{W-1} \cdot \sin(\omega)}{R}$$

R designates the maximum range of the sensor, $$u_x^K = 2^{W-1}$$

$$u_y^K = 2^{W-1}.$$

$$u_z^K = 2^{W-1}$$

According to a variant embodiment of the above-mentioned method, for a grid of side 2R, the information of sensors which are outside of the sphere of radius R are filtered before executing the steps of the method.

According to a variant embodiment of the above-mentioned method, the values of the aforementioned tables are normalized by a value $D_{max} = \sqrt{2} \cdot R$ in 2 dimensions and $D_{max} = \sqrt{3} \cdot R$ in 3 dimensions.

The invention also relates to a device for determining the coordinates of cells $c_i$ liable to be traversed in an observation space represented by a grid G having a first resolution stepsize, a cell being represented by vertices and sides or segments connecting these vertices, characterized in that it comprises at least the following elements:
  One or more sensors suitable for measuring the coordinates of a point measured in the grid resolution stepsize situated at a distance from the target F,
  A module for discretizing the measured coordinates with a spatial resolution stepsize $\delta$ which is smaller than the grid resolution stepsize $R_G$,
  A module for processing the discretized coordinates suitable for executing the steps of the method according to one of Claims 1 to 11.

According to a variant of the above-mentioned device, the observation space is defined by a sensor onboard a moving vehicle (1) and a selected cell is filled by a value of probability of occupancy by an obstacle.

According to a variant embodiment, the invention provides a method for determining the coordinates of cells $c_i$ liable to be traversed in an observation space represented by a grid G having a first resolution stepsize $R_G$, a cell being represented by vertices and segments connecting these vertices characterized in that it comprises at least the following steps:
  Defining the coordinates of a point M by using a space discretized with the aid of a spatial stepsize $\delta$, the spatial stepsize $\delta$ being smaller than the resolution stepsize $R_G$ of the grid G, the size of the cells being defined by size(c)=r·$\delta$, r∈ℕ, the point M with coordinates (l,m) in this discretized space is situated in the continuous space at the point (x,y), where $x = l \cdot \delta$ $y = m \cdot \delta'$ Initializing an error function Err( ) representative of the position of at least one coordinate of a vertex V of the cell $c_s$ containing the source point S with respect to a path defined in the observation space, the path connecting a source point S to a final point F,
  Calculating the error value $Err_d()$ obtained for at least one first vertex V of the cell of the grid in the course of observation,
  Studying the value of the error $Err_d(V)$ computed with respect to a reference value and determining the traversed side of the observed cell by the path [SF] and the following traversed cell $c_{i+1}$,
  Using this following cell $c_{i+1}$ and a first vertex $V_{i+1}$ of this cell as starting point and repeating the steps until at least the cell $c_F$ containing the final point F is reached,
  Establishing the list $\{c_i\}$ of the cells traversed on the path [SF] and using the cells to characterize an object on the path.

BRIEF DESCRIPTION OF THE DRAWINGS

Other characteristics, details and advantages of the invention will become better apparent on reading the description given by way of wholly nonlimiting illustration and with reference to the figures which represent.

DETAILED DESCRIPTION

In order to better elucidate the subject of the invention, the example which follows is given by way of wholly nonlimiting illustration for the detection of obstacles in the case of a car equipped with a camera making it possible to detect obstacles that may be present on its path.

The occupancy grids are a discretization of the observed space into cells. The mapping of "mono-target" sensor information makes it necessary to be able rapidly to find the cells traversed by a straight line.

Let $S(x_S, y_S)$ be the position of the sensor situated on the car, and $F(x_F, y_F)$ the target detected by the sensor. The cells traversed by the segment [SF] must undergo an occupancy update. The point M(x,y) is on the line containing the segment [SF] if and only if:

$$\text{Err}(M) = (y - y_s) \cdot (x_F - x_S) - (x - x_s) \cdot (y_F - y_s) = 0$$

Figure 1:
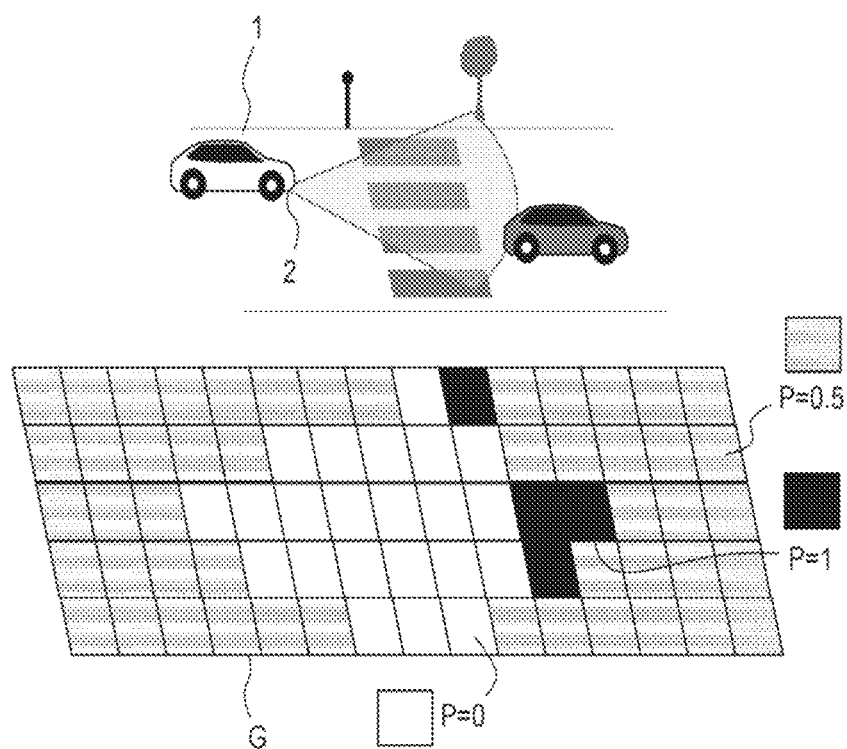
FIG. 1, a representation of the environment model defined with an occupancy grid,
  FIG. 2, a representation of the occupancy mapping,
  FIGS. 3A, 3B, an illustration of the search for traversed cells, and FIG. 3C, the case of the scheme according to the invention,
  FIGS. 3D, 3E, an example of searching for cells traversed in a cone defined by a sensor,
  FIG. 4, an example of steps of the method according to the invention,
  FIG. 5, a computation of the integer representation,
  FIG. 6, a representation of the encompassing domain,
  FIG. 7A to 7F, an exemplary tree scan,
  FIG. 8, a representation of the integer coordinates in 3D and FIG. 9, the switch to spherical coordinates,
  FIGS. 10A, 10B, 10C, a representation of grids for the size of the environment, and
  FIG. 11, an exemplary device for the implementation of the method according to the invention.
Figure 2:
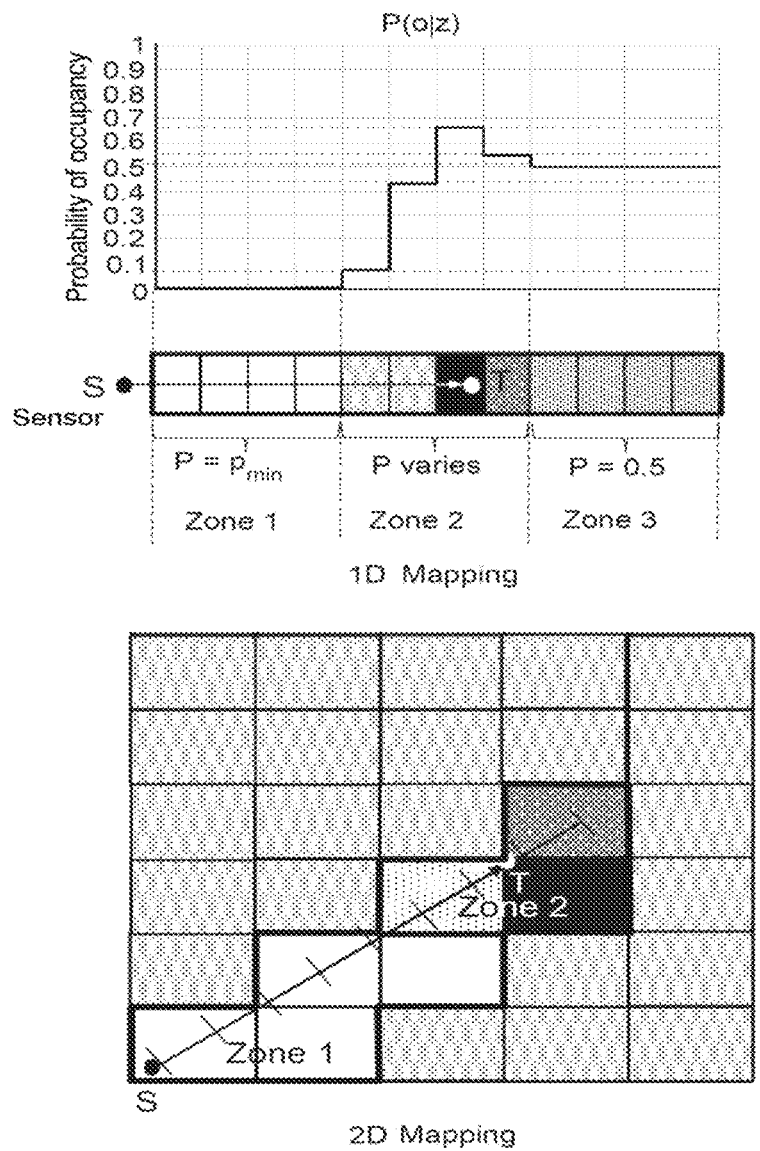
Figure 3A:
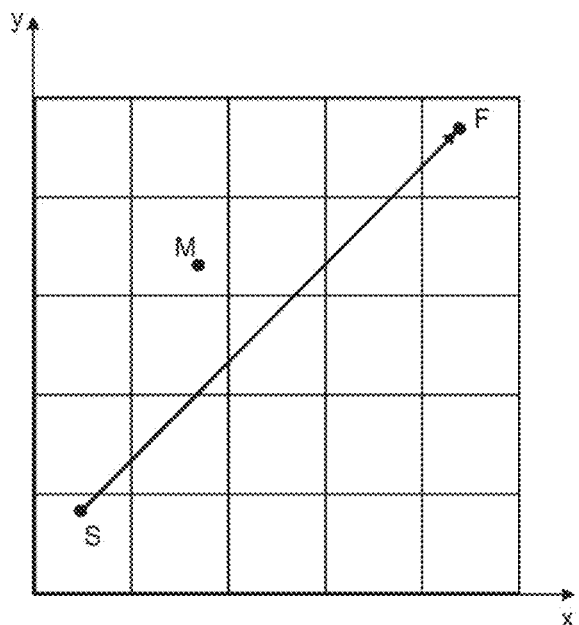
Figure 3B:
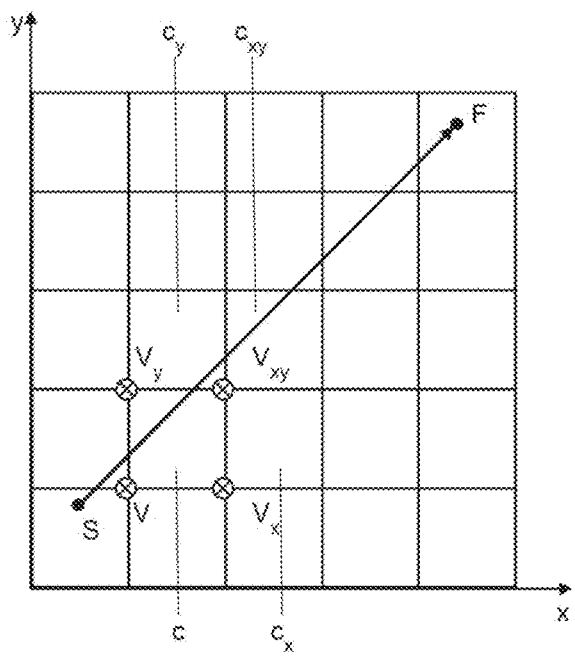

It may then be noted that if two points A and B are situated on either side of the line, then we obtain Err(A) and Err(B) with opposite signs. This property makes it possible to deduce an iterative algorithm for searching for the traversed cells comprising the following steps:

A1) The search algorithm is accordingly initialized to the cell $c = c_S$ where $c_S$ is the cell containing the point S, as in FIG. 3A. It is assumed that a certain number of cells have been scanned, and that we are now situated in a traversed cell c, B1) The errors of the vertices of $V_x$, $V_y$ and $V_{xy}$ of the cell c are then computed, FIG. 3B:

If $\text{Err}(V_{xy}) = 0$, then the next cell is $c_{xy}$,

Otherwise, if $\text{Err}(V_x)$ and $\text{Err}(V_{xy})$ have opposite signs, then the next cell traversed is $c_x$, Otherwise, the next cell traversed is $c_y$, C1) The iteration is continued until the cell c equals $c_F$ the cell containing the point F.

It may be noted that the algorithm assumes $(x_F - x_S) > 0$ and $(y_F - y_S) > 0$. The other cases of inflection of straight lines (negative slopes or other) can be easily deduced from this first case.

The main limitation of this algorithm is that it requires the evaluation of the error function at three points at each iteration, this error function itself requiring several floating-point operations.

To be able to compute the cells traversed by a line in an occupancy grid without resorting to floating-point computation, the method according to the invention uses a (discrete) integer representation of space. The main difficulty resides in the fact that the discretization of the grid itself is not sufficient for the computation of the cells/line intersections. Indeed, the position of the sensors may be known to a more significant resolution than that of the grid.

Figure 3C:
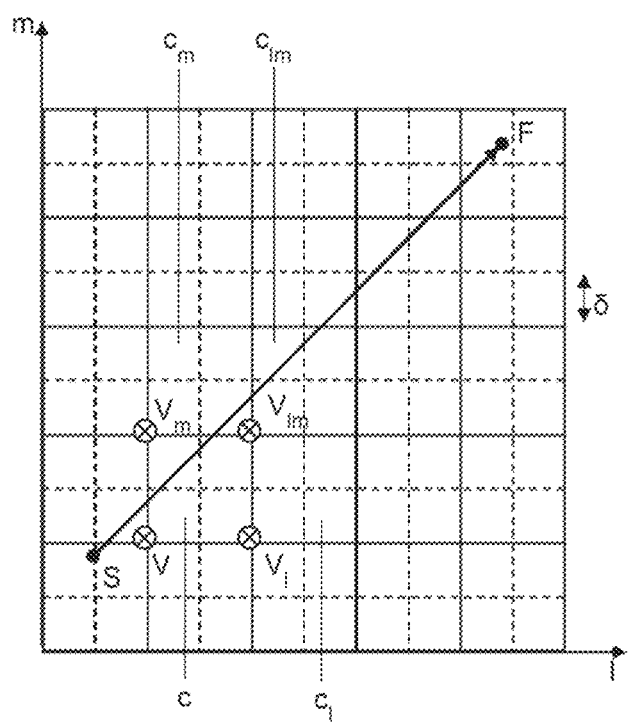

The idea proposed in this invention consists in utilizing, for the search for the traversed cells, a finer discretization than that of the grid to guarantee a precision equivalent to that obtained with the aid of the floating-point scheme presented in FIG. 3C, while performing only simple integer arithmetical operations and obtain a saving in computation time and decrease the resources necessary for the computation. It is accordingly assumed that the observed space is discretized with the aid of a constant spatial stepsize $\delta$, for example. This spatial stepsize is the smallest dimension representable in this discretized space, and consequently the cells of the occupancy grid have sides which must be a multiple of $\delta$. The size of a cell is then:

$$\text{size}(c) = r \cdot \delta, \; r \in \mathbb{N}$$

A point in space with coordinates (l,m) in this discretized space is situated in the continuous space at the point (x,y), with:

$$x = l \cdot \delta$$

$$y = m \cdot \delta'$$

The point S is then represented by its coordinates $(l_S, m_S)$ and the point F by its coordinates $(l_F, m_F)$. All the spatial information is then manipulated with a precision equal to $\delta$.

To solve the problem presented in FIG. 3C, a point M(l, m) is considered. The point M belongs to the straight line containing the segment [SF] if and only if:

$$\text{Err}_d(M) = (m - m_s) \cdot (l_F - l_s) - (l - l_s) \cdot (m_F - m_s) = 0 \quad (1)$$

If V denotes the initial vertex of a cell and $V_l$, $V_m$ and $V_{lm}$ denote the vertices of a cell as presented in FIG. 3C, it is possible to write:

$$\text{Err}_d(V_l) = \text{Err}_d(V) - \Delta m$$

$$\text{Err}_d(V_m) = \text{Err}_d(V) + \Delta l$$

$$\text{Err}_d(V_{lm}) = \text{Err}_d(V_l) + \Delta l \quad (2)$$

where $\Delta l = r \cdot (l_F - l_s)$ and $\Delta m = r \cdot (m_F - m_s)$. These quantities are constant and can be computed once for the entire search over the line SF.

From the definition of $\text{Err}_d(M)$ on the one hand, and from the equations allowing the iterative computation of the errors $\text{Err}_d(V_l)$, $\text{Err}_d(V_m)$ and $\text{Err}_d(V_{lm})$ on the other hand, it is possible to deduce an iterative computation algorithm for the search for the cells traversed by the straight line [SF]:

A2) We begin by finding the cell $c_S$ containing S, and then an error parameter E, with $E = \text{Err}_d(V)$, is initialized with the aid of equation (1), V being the bottom left corner of the current cell in the example given, i.e. the cell $c_S$ in the initialization phase;

B2) The errors of the other vertices of the current cell are thereafter computed with the aid of equations (2), knowing $\text{Err}_d(V)$ computed previously.

The next cell traversed, future value c, and the associated future value E are determined by comparing, for example, the sign of the computed errors, in a manner analogous to the aforementioned cell search algorithm:

If $\text{Err}_d(V_{lm}) = 0$, then $c = c_{lm}$ and $E = \text{Err}_d(V_{lm})$

If $\text{Err}_d(V_{lm})$ and $\text{Err}_d(V_l)$ are of opposite signs, then $c = c_l$ and $E = \text{Err}_d(V_l)$ Otherwise $c = c_m$ and $E = \text{Err}_d(V_m)$, C2) The iteration of step B2 is continued until the last cell containing the point F.

It has been assumed that $\Delta m$ and $\Delta l$ were positive for this example. Without departing from the scope of the invention, it would be possible to apply these steps by adapting them to cases where the slope of the straight line is negative or other cases. These other cases are immediately deduced from the foregoing.

Rather than the sign of the computed error, it is also possible to consider the value of the error and compare it with a reference value.

This new algorithm for computing the traversed cells assumes only a single evaluation of the function $\text{Err}_d(M)$, applied to the bottom left vertex V of the cell containing the starting point, in the example given. The error of the other tested points is computed only in an incremental manner with the aid of equations (2). This algorithm implements two multiplications and five signed additions for initialization, and then only signed additions as the cells are scanned. All the operations are in integer arithmetic. The computation platform used needs to provide only arithmetical operations reduced to: integer multiplication, integer addition and integer subtraction. The method advantageously makes it possible to decrease the computation time and the resources required.

On completion of these steps, the result of the method is in the form of a list of cells $\{c_i\}$, of their coordinates in the grid G, which will be filled by an occupancy probability information item, for example, or else by a parameter encoding a spatial magnitude.

Figure 3D:
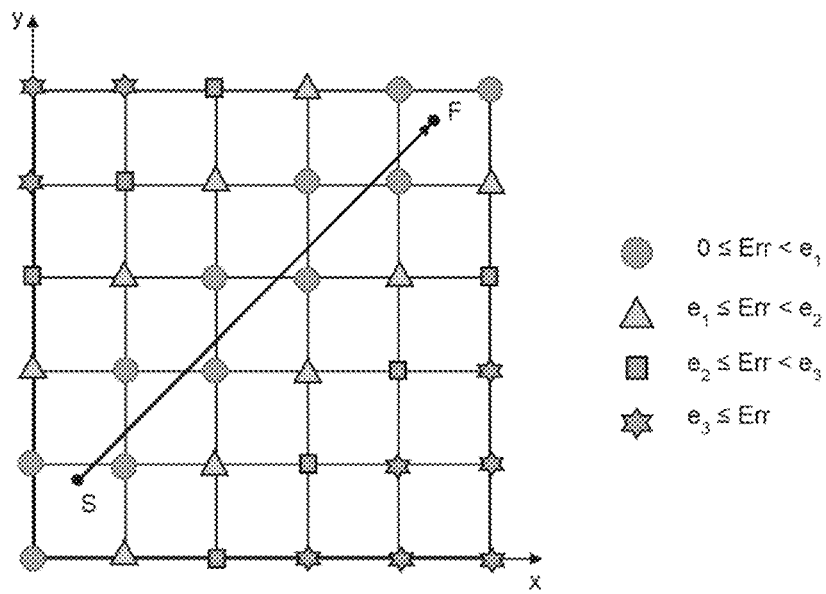
Figure 3E:
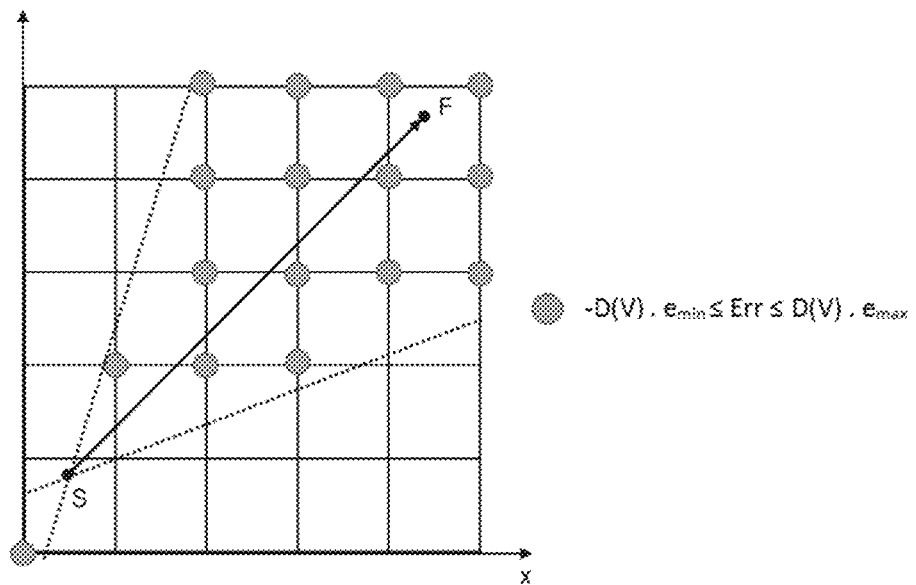

FIGS. 3D and 3E illustrate an example of searching for cells by looking at the value of the error rather than at the sign of the computed error.

FIG. 3D shows diagrammatically the distribution of an error value Err for a set of cell vertices, the error values lying between a minimum $e_{min}$ and a maximum $e_{max}$. The cells represented with a roundel are selected for the error span $0 \leq \text{Err} < e_1$, the cells associated with the triangle for the span $e_1 \leq \text{Err} < e_2$, the cells with the square for the span $e_2 \leq \text{Err} < e_3$ and the star cells for $e_3 \leq \text{Err}$. By separately setting the parameters $e_{min}$ (negative) and $e_{max}$ (positive), the selection criterion "above" the straight line SF or "below" the straight line SF can be adjusted differently.

FIG. 3E shows diagrammatically the case of a vertex error Err lying between a minimum error and a maximum error which depends on the distance of the point from the source. Denoting by D(V) the distance between the vertex V and the point S, it is possible to search for the cells belonging to a detection cone defined by the aperture of the sensor and centered on the point S. A search will be conducted for the cells whose error lies between $D(V) \cdot e_{min}$ and $D(V) \cdot e_{max}$ where $e_{min}$ is a negative constant and $e_{max}$ a positive constant. For example, the cells selected in the figure corresponding to the interval $-D(V) \cdot e_{min} \leq \text{err}(V) \leq d(V) \cdot e_{max}$, are represented by circles.

Figure 4:
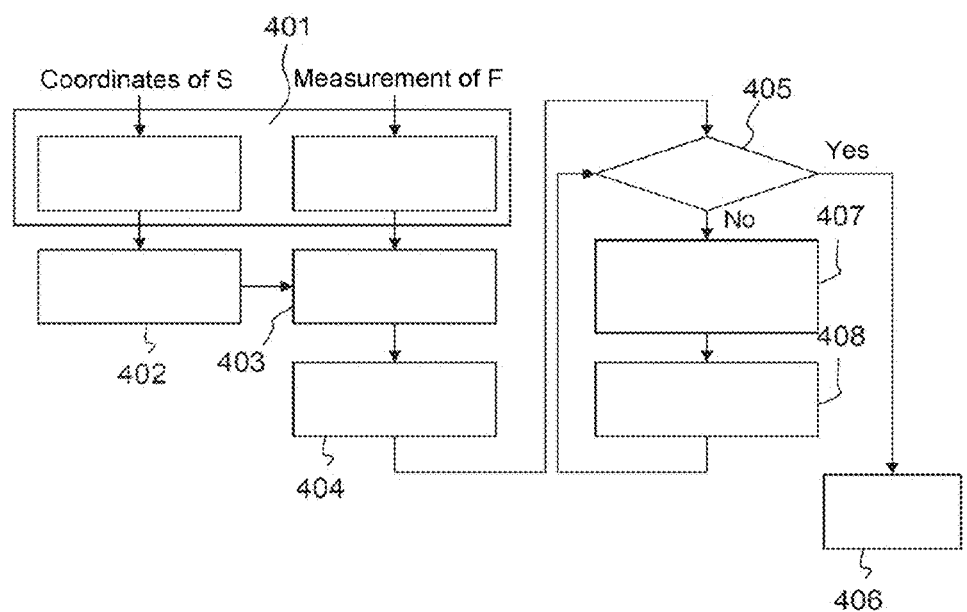

FIG. 4 illustrates an implementation of the steps of the method according to the invention, the coordinates of the sensor S $(S_x, S_y, S_z)$ and the coordinates $(F_x, F_y, F_z)$ of the target point F with the resolution of the grid in 3 dimensions x, y and z:

401—the first step consists in computing the coordinates of the sensor S in coordinates of the sub-resolution $S_\delta(l_s, m_s, n_s)$, and in parallel the coordinates of the target point $F_\delta(l_F, m_F, n_F)$ with the sub-resolution $\delta$ of the grid. We also define $\Delta l$, $\Delta m$ 2nd $\Delta n$ in a similar way to the above-mentioned definition (in relation to equation 2) and we also define a means for evaluating an error Err(M) for a point M(l,m,n) for example by generalizing the above-mentioned equation 1 or for example according to the expressions developed hereinbelow, in conjunction with FIG. 8.

then,

402—the cell $c_s$ containing the sensor S is initialized,

403—the vertex V of the cell containing the point S is determined by analyzing the signs of $\Delta l$, $\Delta m$ and $\Delta n$, for example,

404—the measurement error or errors Err( ) is or are initialized, for the first vertex V of the grid G,

405—a test is conducted to investigate whether the probed cell, or current cell, c contains the target F, If yes then the list of the cells $\{c_i\}$ found is edited, 406, by repeating the steps, If no, then 407 the error values Err(V) for the other vertices of the current cell of the grid G are computed by implementing an analysis method similar to that of the aforementioned algorithm, in particular step B2. The computation of the error values Err(V) can for example be carried out by generalizing the above-mentioned equation 2 or by using the expressions given hereinbelow in conjunction with FIG. 8

408—the next cell to be tested $c_{i+1}$ and its vertex $V_{i+1}$ initial point are identified according to the sign of the computed errors, and then we return to step 405.

The steps are also applied using a value as was described in FIGS. 3D and 3E, rather than the sign of the errors. The cells retained $\{c_i\}$ will be, for example, filled with a value of probability of occupancy or otherwise according to a scheme described in the applicant's patent application FR 1558919. They can also comprise a value corresponding to a spatial magnitude, etc.

According to a variant embodiment, the method will use a digital representation so as to optimize computation time.

The digital representation of an integer number is done with the aid of a field of bits that can have various widths. The widths conventionally encountered are 8, 16, 32 or 64 bits. Specific architectures can also have support for wider integers. In what follows, the width of the integers is assumed to be known and fixed. Without losing generality, and by way of example, this width W is set equal to 32 bits, this width of integer being supported by most computational architectures and in particular by a large number of microcontroller platforms devoid of floating-point arithmetical coprocessor or FPU (Floating Point Unit).

The integers representable on W bits are the integer numbers lying between 0 and $2^W-1$. For W=32, these are the integers lying between 0 and 4294967295. In the method according to the invention it is sought to represent distances and positions inside a fixed domain, that of the occupancy grid. The size of the study domain is thus fixed by the application.

Figure 5:
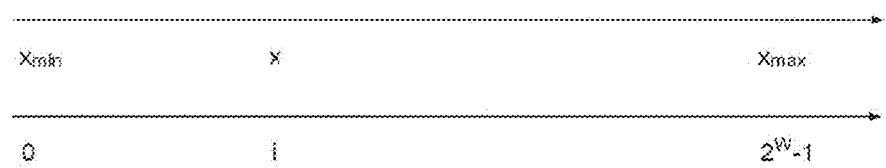
Figure 6:
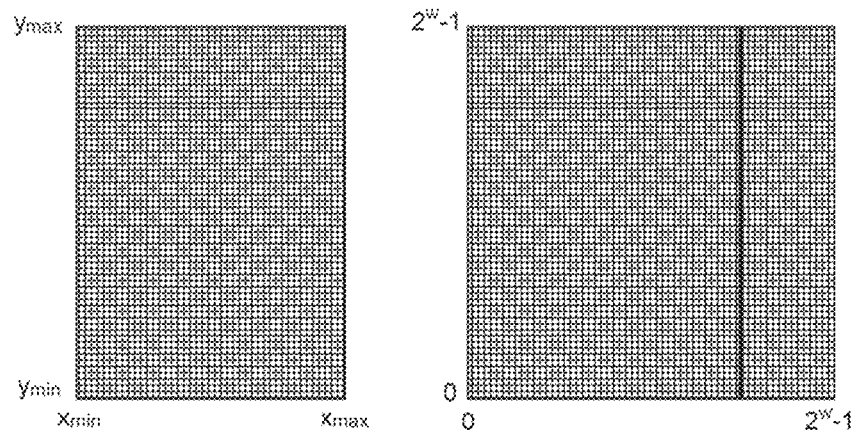

In three dimensions, such a domain can be defined with the aid of the coordinates $(x_{min}, y_{min}, z_{min})$ and $(x_{max}, y_{max}, z_{max})$ of the extreme points of the zone considered. The study domain is then defined by: $[x_{min}, x_{max}] \times [y_{min}, y_{max}] \times [z_{min}, z_{max}]$. The lengths on the three axes, as well as the starting coordinates are not necessarily the same. Let us denote by L the largest length of the domain: $L = \max(|x_{max} - x_{min}|, |y_{max} - y_{min}|, |z_{max} - z_{min}|)$, FIG. 5. The proposed integer arithmetic representation makes it possible to use the W bits to represent just the positions lying between 0 and L. The corresponding integer value is deduced by simple translation and then by homothety, FIG. 5. In the usual case where the lengths are not all the same size, the proposed multi-resolution integer representation is used on a square or cubic domain encompassing the physical domain studied. In FIG. 6, an example of the method applied to a rectangular 2D domain is illustrated. The point $(x_{min}, y_{min})$ becomes the point with integer coordinates (0,0). Moreover the domain $[x_{min}, y_{min}] \times [x_{max}, y_{max}]$ in floating-point coordinates is included in the domain $[0,0] \times [2^W-1, 2^W-1]$ in integer coordinates.

To represent the real position x lying between $x_{min}$ and $x_{max}$ with the aid of an integer $u_x$ lying between 0 and $2^W-1$, the following equation is formed:

$$\frac{x - x_{min}}{x_{max} - x_{min}} \sim \frac{u_x}{2^W}$$

i.e.:

$$u_x = 2^W \cdot \frac{x - x_{min}}{x_{max} - x_{min}}$$

Where $u_x$ corresponds to the integer part

Reciprocally:

$$x = x_{min} + \frac{u_x \cdot (x_{min} - x_{max})}{2^W}.$$

Similar principles are used to represent the real position y and the real position z.

In practice, the conversion from floating-point coordinates to integer coordinates thus requires a certain number of floating-point arithmetical operations which can be an obstacle for the practical implementation of the scheme on processors having no FPU.

A first advantage of such a representation is that the W bits used to represent the positions in an occupancy grid are all utilized. A floating-point representation of the same width will be much less precise in the interval considered. By way of example, let us consider that W=32 and that the space studied is situated between $x_{min}$=−15 m and $x_{max}$=15 m and let us seek to represent the point x=2.17 m. In single-precision floating-point numbers the candidates are:

TABLE 1

| 32-bit binary value in hexadecimal notation | Real approximation |
| --- | --- |
| 0x400AE147 | 2.169999838 |
| 0x400AE148 | 2.170000076 |
| 0x400AE149 | 2.170000315 |

By comparing with the 32-bit integer representation adopted by the invention, the results obtained are:

TABLE 2

| 32-bit integer value in decimal notation | Real approximation |
| --- | --- |
| 2458152949 | 2.169999999 |
| 2458152950 | 2.170000010 |
| 2458152951 | 2.170000017 |

As seen in Tables 1 and 2, the numerical precision of the approach is much higher than the floating-point approach, while not consuming more bits for the representation of the numbers.

The occupancy grids are a discretization of the observed space into cells. Initially, it is assumed that this discretization is uniform and cartesian. To update the probability of occupancy of a cell, it is necessary to be able rapidly to find the cell which contains a particular position (x,y,z). It is assumed that the cells are indexed by independent integer indices in each dimension: finding the cell which contains the position (x,y,z) amounts to finding the triplet (i,j,k) of integers which designates the sought-after cell.

It is assumed that there are $N_x$ cells on the x axis, $N_y$ on the y axis and $N_z$ on the z axis. The coordinates (i,j,k) sought are then typically determined by the equations:

$$i = \frac{(x - x_{min}) \cdot N_x}{x_{max} - x_{min}}$$

$$j = \frac{(y - y_{min}) \cdot N_y}{y_{max} - y_{min}}$$

$$k = \frac{(z - z_{min}) \cdot N_z}{z_{max} - z_{min}}$$

where the computed indices are the integer parts of the fractions hereinabove.

In these formulae, the ratios can be precomputed on the basis of the constant elements which define the occupancy grid (size, number of cells), the search for the index then requires only a floating-point subtraction and a floating-point multiplication per coordinate.

Let us now consider the search for the index (i,j,k) of a cell containing the position u represented by the integer triplet ($u_x$, $u_y$, $u_z$) such as defined previously. If the expression which defines $u_x$ is inserted into the above expression, we obtain for the first dimension:

$$i = \frac{u_x \cdot N_x}{2^W}$$

Hereinafter, it can be assumed without losing generality (short of modeling a larger or more resolved environment) that $N_x$ is a power of 2:

$$N_x = 2^{d_x}$$

The expression for computing i on the basis of $u_x$ becomes:

$$i = \frac{u_x}{2^{W-d_x}}$$

However, in binary integer arithmetic, division by a power of 2 amounts to a right shift by a number of bits which is equal to the exponent of the power:

$$i = (u_x >> (W - d_x))$$

The computation is similar for the other two dimensions. Thus, the computation of the index of the cell containing a position ($u_x$, $u_y$, $u_z$) requires only a constant right shift per dimension.

In addition to allowing fast location of the cells containing a point represented by its integer coordinates, the approach also makes it possible to rapidly ascertain the coordinates of the cells for any grid size of the form $2^d$ where d is an integer between 1 and W. In particular, in the case of multi-resolution approaches, the proposed integer coordinates make it possible to reflect the information with a single parameter whatever the resolution used, on condition that the resolutions considered are distinct by a factor which is a power of 2.

An important practical case of use is quadtree/octree based occupancy grid algorithms. It is indeed shown with the aid of the foregoing that the representation in integer coordinates can allow iterative determination of the hierarchical scan in the octree or quadtree structure by inspecting the bits in the order from high weight to low weight.

The high-order bit makes it possible to distinguish in which half of the axis the position represented is situated. If the bit equals 0, the position is in the half space (0, L/2) and if it equals 1, it is situated in the half-space (L/2,L). By looking at the following bit, the same analysis can be done on the two sub-regions of the current region, and so on and so forth.

By proceeding in this way in all the dimensions, the octree or the quadtree is thus scanned with the aid of a single integer representation of position. The resulting maximum depth being W.

Let us take for example a square 2D grid of side 16 m, with $x_{min}$=0 and $y_{min}$=0. Let us consider the floating-point position x=3.5 m and y=10.5 m. The corresponding integer position equals for W=32:

| | Floating-point | Integer | Integer (binary) |
|---|---|---|---|
| x | 3.5 | 939524096 | 00111000 00000000 00000000 00000000 |
| y | 10.5 | 2818572288 | 10101000 00000000 00000000 00000000 |

Figure 7A:
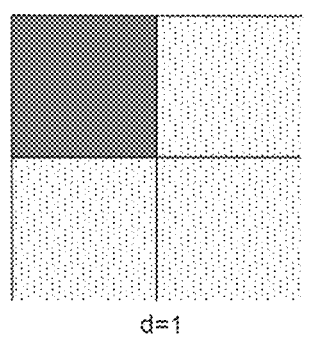
Figure 7B:
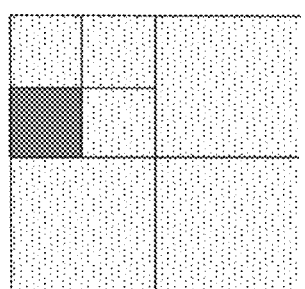
Figure 7C:
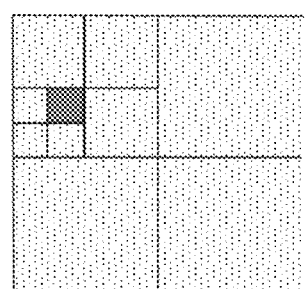
Figure 7D:
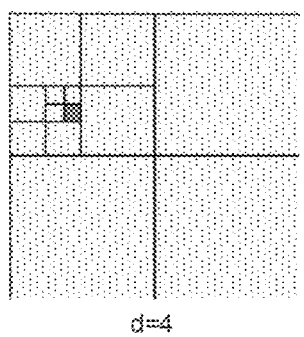
Figure 7E:
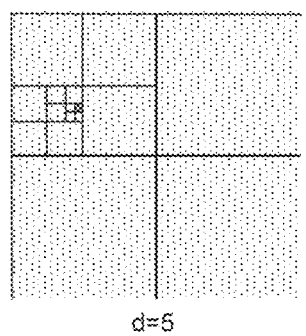
Figure 7F:
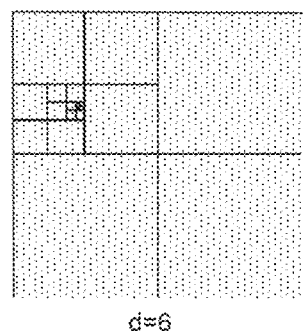

For d=1, the reading of the first bit indicates that the corresponding position is in the bottom part on the x axis, and top part on the y axis, FIG. 7A. Thereafter for d=2, the second bit indicates that the position is in the (bottom, bottom) part of the square found at d=1, FIG. 7B. Thereafter for d=3, the position is in the (top, top) part FIG. 7C, and so on and so forth FIG. 7D to 7F.

In the particular case where the spatial discretization δ is such that:

$$\frac{x_{max} - x_{min}}{2^W} = \delta$$

The coordinates (l,m) described previously coincide with the coordinates ($u_x$, $u_y$). If the depth of the grid is d, that is to say if there are $2^d$ cells in each dimension, the resolution of the representation is then:

$$r = \frac{c}{\delta} = 2^{W-d}$$

Thus, as a function of the chosen precision, it is possible to consider just the W high-order bits of the representation in integer coordinates.

For example, if we want at least 1000 cells on each side of the grid, we will select d=10 so that $2^d$=1024. Moreover if we want to be precise to a $50^{th}$ of the size of each cell, we must have:

$$2^{W-d} \geq 50$$

$$W \geq \log_2(50) + d$$

$$W \geq 16$$

Only the first 16 bits of the integer representation are necessary to simultaneously represent a position in the grid, and an entire grid traversal computation precise to a $50^{th}$ of the size of the cells.

We have seen that in the scheme, it is necessary to begin by computing the initial error which requires two integer products. The results of these products can involve the manipulation of numbers whose width exceeds the W bits of the representation, thereby posing a problem for the practical implementation.

If one looks more precisely at the expression for $Err_d(V)$, it is seen that the quantities ($m-m_s$) and ($l-l_s$) are bounded above by $r=2^{W-d}$ and that the quantities ($m_F-m_s$) and ($l_F-l_s$) are bounded above per $2^W$. If T denotes the total width required in order to manipulate the products, we then have:

$$(T-1) = 2 \cdot W - d$$

$$W = \frac{T+d-1}{2}$$

The product must not exceed T−1 and not T, since the result of the products can be signed in the general case.

Returning to the previous example, and assuming that the integer arithmetic unit used manipulates numbers on T=32 bits maximum, we obtain W=(32+10−1)/2=21. The usable maximum precision is W=21 bits. We then have a grid traversal computation precise to 1 in $2^{21-10}$, i.e. precise to a $2048^{th}$. Finally it is noted that for the computation of the quantities Δm and Δl, the same remarks apply in respect of the width of the numbers and the precision of the traversal computation.

The solution of the three-dimensional problem generalizes directly on the basis of the two-dimensional solution presented above. The idea is to apply the foregoing to the projection of the 3D line onto the three planes in space z=0 (Oxy plane), x=0 (Oyz plane) and y=0 (Oxz plane).

Let M(l, m, n) be a 3D point with integer coordinates. We then form the three quantities:

$$Err_{d\_xy}(M) = (m-m_s) \cdot (l_t-l_s) - (l-l_s) \cdot (m_t-m_s)$$

$$Err_{d\_yz}(M) = (n-n_s) \cdot (m_t-m_s) - (m-m_s) \cdot (n_t-n_s)$$

$$Err_{d\_xz}(M) = (l-l_s) \cdot (n_t-n_s) - (n-n_s) \cdot (l_t-l_s)$$

Figure 8:
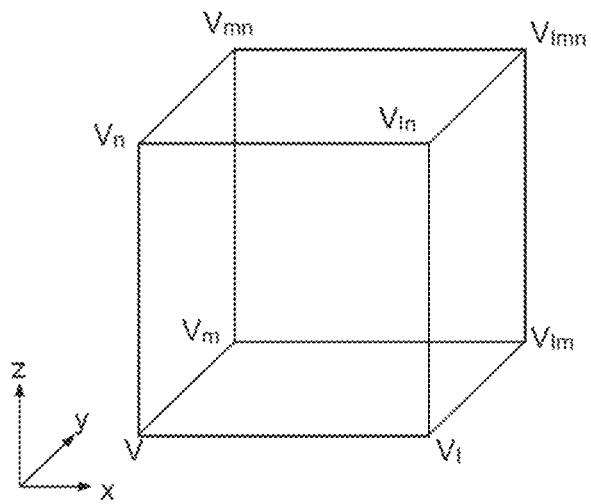

In a manner analogous to the foregoing in 2D, denoting by V, $V_l$, $V_m$, $V_n$, $V_{lm}$, $V_{ln}$, $V_{mn}$, $V_{lmn}$ the vertices of a three-dimensional cell, as in FIG. 8. We then have:

$$Err_{d\_xy}(V_l) = Err_{d\_xy}(V) - \Delta m$$

$$Err_{d\_xy}(V_m) = Err_{d\_xy}(V) + \Delta l$$

$$Err_{d\_xy}(V_{lm}) = Err_{d\_xy}(V_l) + \Delta l$$

$$Err_{d\_yz}(V_m) = Err_{d\_yz}(V) - \Delta n$$

$$Err_{d\_yz}(V_n) = Err_{d\_yz}(V) + \Delta m$$

$$Err_{d\_yz}(V_{mn}) = Err_{d\_yz}(V_m) + \Delta m$$

$$Err_{d\_xz}(V_n) = Err_{d\_xz}(V) - \Delta l$$

$$Err_{d\_xz}(V_l) = Err_{d\_xz}(V) + \Delta n$$

$$Err_{d\_xz}(V_{ln}) = Err_{d\_xz}(V_n) + \Delta n$$

Where $\Delta l = r \cdot (l_t - l_s)$, $\Delta m = r \cdot (m_t - m_s)$ and $\Delta n = r \cdot (n_t - n_s)$.

In the same manner, it is thus possible to determine in an iterative manner the error estimations of the various vertices of the cell. By looking at the sign of the errors face by face of a three-dimensional cell, it will then be possible to determine, in a manner analogous to the 2D case, which cell will be traversed next by the segment [SF].

Figure 9:
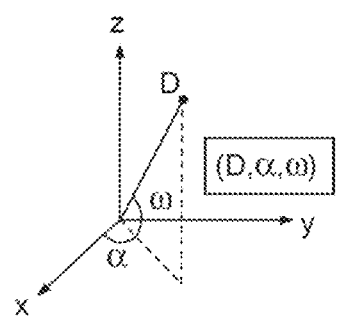

The distance sensors used naturally return information expressed in their own frame. Their own frame is usually a spherical frame centered on the sensor. The spherical frame used is described in FIG. 9, on the radius, longitude, latitude model. It is assumed that the sensor returns the three items of information D, α, ω:

D: distance of the target

α: longitude measured on the basis of the x axis

ω: latitude, measured from the equatorial plane

These items of information are returned by the sensor in the form of a field of integer bits, with a variable precision from one sensor to another.

Conversion into cartesian coordinates requires the following computations:

$$x = D \cdot \cos(\omega) \cdot \cos(\alpha)$$

$$y = D \cdot \cos(\omega) \cdot \sin(\alpha)$$

$$z = D \cdot \sin(\omega)$$

The computation of the trigonometric functions and resulting floating-point multiplications is very often expensive to carry out on an onboard embedded computation processor. Moreover, to utilize the integer coordinates presented above, it is necessary moreover to perform the transform:

$$u_x = 2^W \cdot \frac{D \cdot \cos(\omega) \cdot \cos(\alpha) + R}{2R}$$

$$u_y = 2^W \cdot \frac{D \cdot \cos(\omega) \cdot \sin(\alpha) + R}{2R}$$

$$u_z = 2^W \cdot \frac{D \cdot \sin(\omega) + R}{2R}$$

where R designates the maximum range of the sensor ($x_{min}=-R$ and $x_{max}=R$, likewise for the other axes). The computation of the integer coordinates requires an additional floating-point division.

According to a variant embodiment, the method will compute the integer coordinates by means of an intermediate step, which is the computation of the offset at the center, as an integer. Accordingly, the point K, which is the center of the frame, is introduced. We then have:

$$x_K = \frac{x_{min} + x_{max}}{2}$$

$$y_K = \frac{y_{min} + y_{max}}{2}$$

$$z_K = \frac{z_{min} + z_{max}}{2}$$

i.e. in integer coordinates:

$u_x^K = 2^{W-1}$ $u_y^K = 2^{W-1}$ $u_z^K = 2^{W-1}$

The equations for transforming to integer coordinates presented previously then become:

$$u_x - u_x^K = D \cdot \frac{2^{W-1} \cdot \cos(\omega) \cdot \cos(\alpha)}{R}$$

$$u_y - u_y^K = D \cdot \frac{2^{W-1} \cdot \cos(\omega) \cdot \sin(\alpha)}{R}$$

$$u_z - u_z^K = D \cdot \frac{2^{W-1} \cdot \sin(\omega)}{R}$$

which can be rewritten in the form:

$u_x - u_x^K = D \cdot T_x(\alpha, \omega)$ $u_y - u_y^K = D \cdot T_y(\alpha, \omega)$ $u_z - u_z^K = D \cdot T_z(\omega)$ The method then consists in precomputing the trigonometric functions $T_x(\alpha,\omega)$, $T_y(\alpha,\omega)$ and $T_z(\omega)$. The results are stored in an integer table so that during execution it is only necessary to compute an integer multiplication to obtain the offset at the center in integer coordinates. The values of this table then lie between $-2^{W-1}/R$ and $2^{W-1}/R$ and will have to be stored on a field of bits of at most W bits.

If one looks more precisely at the width of the distance information returned by the sensor L, it is seen that $R=2^L$ and that the trigonometry values can be stored on signed integers of W-L bits. For example if W=32 bits, and L=16 bits, it will be possible to tabulate the trigonometry on 16-bit signed integers.

Moreover, it is then noted that the quantity D/R lies between 0 and 1, and that the products of trigonometric functions lie between −1 and 1. The offset at the center thus lies between $-2^{W-1}$ and $2^{W-1}$, and is therefore representable with the aid of a W-bit signed integer.

The computation of the integer coordinate amounts to adding $2^{W-1}$ to the offset value to form a quantity lying between 0 and $2^W$. The transformation of the spherical frame (FIG. 9) to the cartesian frame with integer coordinates then requires only a multiplication and an integer addition per component.

The size of the trigonometry tables will depend on the angular sensitivity of the sensor used, but it is for example typically possible to have a table of 100×50=5000 integer values for a sensor having a field of vision of 100° horizontal×50° vertical precise to a degree. For L=16 bits for the distance, and W=32 for the integer resolution of the mapping computation, this involves storing the values on 16 bits (2 bytes) i.e. tables of the order of 10 Kbytes for the x and y coordinates, 100 bytes for the z coordinate.

For more resolved models, the size of the tables can become prohibitive, it is then possible to decrease the memory need, at the price of an additional integer multiplication by separating the variables. For example, for $T_x$ we have:

$$T_x(\alpha, \omega) = \frac{2^{(W-1)/2} \cdot \cos(\alpha)}{\sqrt{R}} \cdot \frac{2^{(W-1)/2} \cdot \cos(\omega)}{\sqrt{R}}$$

The size of the tables is then drastically reduced at the price of a loss of precision.

Figures 10A, 10B, 10C:
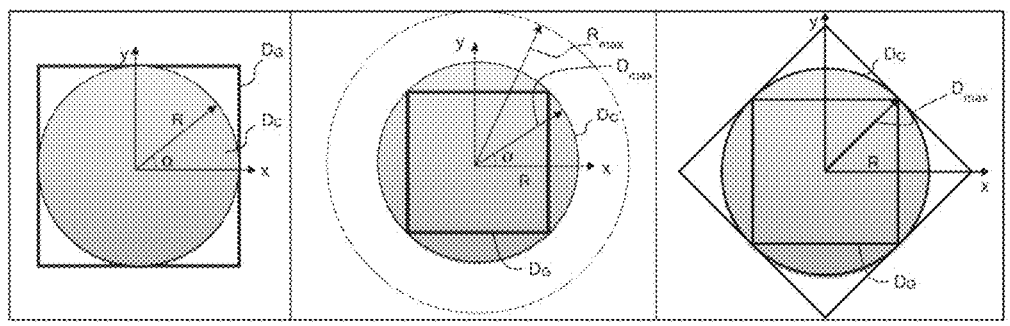

In what was presented above, it was assumed that the grid study domain covered the whole range of the sensor. The domain of definition $D_G$ of the occupancy grid thus contains the whole domain $D_C$ covered by the sensor of maximum range R, as presented in FIG. 10A.

In a more general case, one will want to fix the domain of definition of the grid independently of the range of the sensor. Indeed, the size of the grid is often determined more by the application than by the physical characteristics of the sensor. One may for example want to study a domain of 50 m×50 m whilst a sensor with a range of 200 m is used. The corresponding situation is presented in FIG. 10B. A grid of side 2R is considered, where R is the utilized maximum range of the sensor. The maximum visible distance of the sensor is then $R_{max}$ and we have: $R_{max} > R$.

For a grid of side 2R, we begin by filtering the information of sensors that are outside the sphere of radius R. The problem is that not all the points of the sphere of radius R are then representable with integer coordinates, since certain points may be in the sphere but outside the grid.

The maximum distance $D_{max}$ that can be reached in the grid is attained at each vertex of the grid and equals $D_{max} = \sqrt{2} \cdot R$ in 2D, and $D_{max} = \sqrt{3} \cdot R$ in 3D. By normalizing the above expression by this new value, we then obtain:

$$u_x - u_x^K = D \cdot \frac{2^{W-1} \cdot \cos(\omega) \cdot \cos(\alpha)}{D_{max}}$$

-continued $$u_y - u_y^K = D \cdot \frac{2^{W-1} \cdot \cos(\omega) \cdot \sin(\alpha)}{D_{max}}$$

$$u_z - u_z^K = D \cdot \frac{2^{W-1} \cdot \sin(\omega)}{D_{max}}$$

In particular, in the 2D case, by multiplying top and bottom by $\sqrt{2}$ we obtain:

$$u_x - u_x^K = D \cdot \frac{2^{W-2} \cdot \sqrt{2} \cdot \cos(\omega) \cdot \cos(\alpha)}{R}$$

$$u_y - u_y^K = D \cdot \frac{2^{W-2} \cdot \sqrt{2} \cdot \cos(\omega) \cdot \sin(\alpha)}{R}$$

It is readily verified that as $D_{max}=\sqrt{2}\cdot R$, the coordinates lie between $-2^{W-1}$ and $2^{W-1}$ and that these numbers are representable on signed integers of W bits. On the other hand, the very beneficial property that this normalization by $\sqrt{2}$ allows is that if the high-order bit is zero, that is to say that the computed coordinate lies between $-2^{W-2}$ and $2^{W-2}$, and in the grid. Indeed, normalizing by $D_{max}=\sqrt{2}\cdot R$ amounts to placing the points in a grid of side $2\sqrt{2}\cdot R$. That is to say as previously, a grid whose edge is circumscribed with the circle of radius $D_{max}$. However, the grid in which it is sought to place the information is, itself, of side 2R. Placing the circumscribed and inscribed grid as in FIG. 10C proves that the side of the inscribed grid (2R) is equal to half the diagonal of the circumscribed grid. This semi-diagonal equals $\sqrt{2}\cdot D_{max}=\sqrt{2}\cdot\sqrt{2}\cdot R=2R$.

Consequently, the 32-bit coordinate at the largest distance in the circumscribed grid is at $(D_{max}, D_{max})$, i.e. at a distance of $\sqrt{2}\cdot D_{max}$. However, it is known that this coordinate will be represented on W integer bits. As $\sqrt{2}\cdot D_{max}=2R$, it is seen that the lower coordinates which are positioned at the most at R, are less than $\sqrt{2}\cdot D_{max}/2$ and therefore representable on a signed integer of W−1 bits.

It is consequently possible to precompute the trigonometry and store it in integer constant tables defined by:

$$T_x(\alpha, \omega) = \frac{2^{W-2} \cdot \sqrt{2} \cdot \cos(\omega) \cdot \cos(\alpha)}{R}$$

$$T_y(\alpha, \omega) = \frac{2^{W-2} \cdot \sqrt{2} \cdot \cos(\omega) \cdot \sin(\alpha)}{R}$$

This ensures that the integer products $D \cdot T_x$ and $D \cdot T_y$ will satisfy the W-bit computation width constraint.

The result of the computation of the integer coordinates can therefore be summarized as:

A3) Form the Distance X Trigonometry product,

B3) Verify that the high-order bit is zero, otherwise the point is not in the grid, but in the sphere of radius R, C3) Multiply the result by 2 (left shift of one rank) to obtain an integer coordinate of W bits, and add the coordinate of the center ($2^{W-1}$).

In conclusion the parameterization thus defined makes it possible to fix the size of the environment independently of the range of the sensor, while guaranteeing the final size of the representation. The spatial resolution will then be slightly lower (low-order bit still at 0) but the integer computation will not require more bits and will comply with the width W constraint.

This approach generalizes directly to 3D, by taking $D_{max}=\sqrt{3}\cdot R$.

Figure 11:
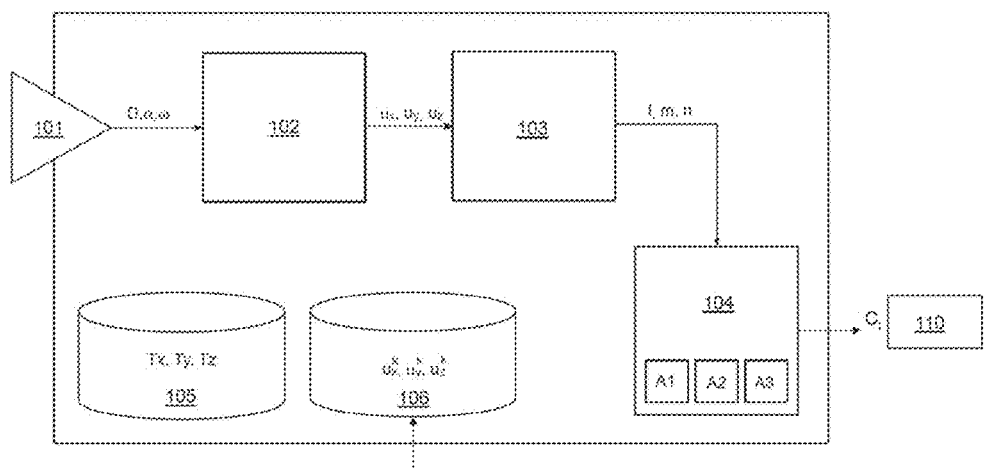

FIG. 11 illustrates an example, given in the case of a sensor fitted to the vehicle 1, of a system for searching for cells according to the invention. The sensor 100 is positioned on the vehicle 1 and has a given range and a given field of vision. The sensor 100 transmits the measured parameters D, α, ω corresponding to a first measurement of distance to an obstacle F, to a first block 101 for processing the data. The first block 101 is suitable for transforming the spherical coordinates into cartesian coordinates, $u_x$, $u_y$, $u_z$. The transformed coordinates are thereafter transmitted to a module 102 for discretizing the coordinates on the fine grid with a stepsize of δ. The "discretized" coordinates are processed by an algorithm embedded onboard the module 103 which executes the steps of the cell search algorithm. The algorithm A1 will search for the cells traversed by considering a zero error with respect to a straight line. The algorithm A2 will take account of an error value lying in a given error interval and the algorithm A3 will search for cells traversed in a cone defined by the sensor's axis of vision. On output from the cell search module 103, a list of the cells selected $\{c_i\}$ is for example transmitted to an operator or an alert or display system 110.

The module 102 comprises an algorithm making it possible to represent in the numerical domain an integer number such as it has been described hereinabove, so as to represent on a number of given bits the real position of the coordinates of the points or of a cell.

The system comprises an internal memory 105 comprising the trigonometric tables Tx, Ty, Tz used for transforming the coordinates of the spherical frame to the cartesian frame. This memory can be fixed initially.

It also comprises a database 106 containing the position of the sensors. The memory can be filled in a static manner or else be updated in real time so as to take the displacement of the sensors into account.

The steps which have just been described can be modified so as to be implemented for the determination of cells liable to be occupied and according to a route or a path of a car comprising a set of straight line segments for example, a nonlinear path. The measurement can be carried out by taking as reference, not a straight line, but an axis belonging to the cone of aperture of the detection sensor. The parameter used to determine the sign of the error may be a predefined value.

The example is described in respect of the acquisition of data with a sensor. The steps may be repeated on several sensors, it being possible for the results originating from the various sensors to be merged according to a known prior art scheme, for example, by using the method described in the applicant's patent application FR1558919.

Without departing from the scope of the invention, the method can also be used to determine the cells to be used for three-dimensional image reconstruction.

The invention described in this document allows the realization of a system for perceiving the 2D or 3D environment constructed with the aid of several heterogeneous distance sensors placed at various sites. The particularity of the system is that it employs, in particular for mapping the occupancy information, a hierarchical digital representation compatible with the traditional integer arithmetic available in the majority of computation systems. The computation of the mapping is then carried out in an extremely effective manner with integer arithmetic alone, and with the same spatial precision as the reference floating-point approaches.

Moreover the invention is compatible with structures of grids which comprise cells of different sizes. This makes it possible for example to define occupancy grids whose resolution is suitable for those of the sensors, in particular whose resolution decreases as the cells get more remote.

The invention claimed is:

1. A method for detecting and locating material bodies on an at least 2-dimensional occupancy grid G, said grid G having a first resolution stepsize $R_G$, and comprising a set of cells represented by vertices and segments connecting these vertices, each cell of the occupancy grid having an associated probability of occupancy by a material body, the method using a sensor for detecting obstacles which is positioned at a source point S, said sensor being connected to a discretization module, and cell search processing module, said method comprising:

a) acquisition by said sensor of a measurement of the position of a material body detected at a point F;

b) definition by said discretization module of the coordinates of the points S and F in a space discretized with the aid of a spatial stepsize δ, the spatial stepsize δ being smaller than the resolution stepsize $R_G$ of the grid G, the size of the cells being defined by r*δ, with r being an integer, a point M with coordinates (l, m, n) in this discretized space being situated in the continuous space at the point (x, y, z), where $x = l \cdot \delta$ $y = m \cdot \delta$ the points S and F having respectively coordinates ($l_S$, $m_S$, $n_S$) and ($l_F$, $m_F$, $n_F$);

the values n, $n_S$ and $n_F$ being unconsidered or equal to zero in case of a 2D occupancy grid G; and c) determination by said cell search processing module of the cell $c_s$ of the occupancy grid G containing the point S;

d) determination by said cell search processing module of the coordinates, in the discretized space, of an initial vertex V0 of the cell $c_s$;

e) computation by said cell search processing module of the value of an, integer, error parameter E by using an error function $Err_d(M)$ to evaluate, in the discretized space, an offset between a point of the space and a straight line connecting the points S and F, said error parameter E being initialized to the value taken by said error function for said initial vertex V0 of the cell $c_s$;

f) computation by said cell search processing module of the value of said error parameter E for at least one first vertex $V1_i$ of the current cell $c_i$ of the occupation grid, corresponding to $Err_d(V1_i)$, this computation consisting in carrying out an addition or subtraction operation between integer numbers, between on the one hand said value of the parameter E, obtained for the initial vertex $V0_i$ of the current cell $c_i$, and corresponding to $Err_d(V0_i)$, and on the other hand an integer increment value (Δ) predefined as a function of the coordinates of the points S and F in the discretized space, g) studying by said cell search processing module the previously computed value of the error parameter E with respect to a reference value to determine a following cell $c_{i+1}$ traversed by the path [SF];

h) computing by said cell search processing module the value of said error parameter E for an initial vertex $V0_{i+1}$ of the following cell $c_{i+1}$, corresponding to $Err_d(V0_{i+1})$, this computation consisting in carrying out an addition or subtraction operation between integer numbers, between on the one hand said value of the parameter E, obtained for at least one vertex $V_i$ of the current cell $c_i$, and corresponding to $Err_d(V_i)$, and on the other hand an integer increment value (Δ) predefined as a function of the coordinates of the points S and F in the discretized space, i) using by said cell search processing module this following cell $c_{i+1}$ and said value of the error parameter E, obtained for said initial vertex $V0_{i+1}$ of this cell, as starting point and repeating steps f to h until at least the cell $c_F$ containing the final point F is reached, j) determining by said cell search processing module the list $\{c_i\}$ of cells considered in the previous steps and situated on the path [SF] or situated a predefined distance from the path [SF] and updating the probability of occupancy of each listed cell in said occupancy grid G.

2. The method according to claim 1 wherein, in the course of step f, a value of said error parameter E, corresponding to $Err_d(V)$, is computed for each "additional" vertex V of the current cell $c_i$, other than the initial vertex, this computation consisting in carrying out an addition or subtraction operation between integer numbers, between on the one hand said value of the parameter E, obtained for the initial vertex $V0_i$ of the current cell $c_i$, and corresponding to $Err_d(V0_i)$, and on the other hand an integer increment value (Δ) predefined as a function of the coordinates of the points S and F in the discretized space, and in which, in the course of step g, the following steps are performed:

a search is conducted to investigate whether one of the values of said error parameter E, obtained for the additional vertices, is zero for an identified vertex and, in the affirmative, this vertex is subsequently the initial vertex of the following cell $c_{i+1}$, the error parameter E corresponding to this new initial vertex being equal to that computed previously for said identified vertex;

and in the negative, a search is conducted for a side, or a face, of the current cell $c_i$ defined by additional vertices associated with values of the parameter E of opposite signs, said following cell $c_{i+1}$ then being the cell adjacent to the current cell $c_i$ sharing the same side, one of the additional vertices belonging to this common side then being the initial vertex of the following cell $c_{i+1}$, the error parameter E corresponding to this new initial vertex being equal to that computed previously for this said vertex;

and wherein the list $\{c_i\}$ of the cells defined in step j corresponds to the cells traversed by the straight line segment between the points S and F.

3. The method according to claim 1 wherein the occupancy grid is defined in 2 dimensions and in which, the error function $Err_d(M)$ is defined by:

$Err_d(M) = (m - m_S) \cdot (l_F - l_S) - (l - l_S) \cdot (m_F - m_S),$ and wherein, in the course of step f, a value of the error parameter is computed for each "additional" vertex V of the current cell $c_i$, other than the initial vertex V0, and designated $V_l$, $V_m$ and $V_{lm}$, $V_{lm}$ being the vertex opposite to the initial vertex, according to the following operations:

$Err_d(V_l) = Err_d(V) - \Delta m$ $Err_d(V_m) = Err_d(V) + \Delta l$ $Err_d(V_{lm}) = Err_d(V_l) + \Delta l$ where $\Delta l = r \cdot (l_F - l_S)$ and $\Delta m = r \cdot (m_F - m_S)$.

4. The method according to claim 2, wherein during step g, by comparing the sign of the computed errors, the next cell traversed is determined in the following manner:

If $\text{Err}_d(V_{lm})=0$, then the cell ci+1 corresponds to the cell having an initial vertex corresponding to Vim and the error parameter E associated with this new initial vertex is equal to $\text{Err}_d(V_{lm})$, If $\text{Err}_d(V_{lm})$ and $\text{Err}_d(V_l)$ are of opposite signs, then the cell ci+1 corresponds to the cell having an initial vertex corresponding to $V_l$ and the error parameter E associated with this new initial vertex is equal to $\text{Err}_d(V_l)$, Otherwise the cell $c_{i+1}$ corresponds to the cell having an initial vertex corresponding to $V_{lm}$ and the error parameter E associated with this new initial vertex is equal to $\text{Err}_d(V_m)$.

5. The method according to claim 1 wherein the occupancy grid is defined in 3 dimensions and in which, the error function $\text{Err}_d(M)$ is defined for a point $M(l, m, n)$ in integer coordinates in the following manner:

$$\text{Err}_{d\_xy}(M)=(m-m_s)\cdot(l_t-l_s)-(l-l_s)\cdot(m_t-m_s)$$

$$\text{Err}_{d\_yz}(M)=(n-n_s)\cdot(m_t-m_s)-(m-m_s)\cdot(n_t-n_s)$$

$$\text{Err}_{d\_xz}(M)=(l-l_s)\cdot(n_t-n_s)-(n-n_s)\cdot(l_t-l_s)$$

and wherein, in the course of step f, a value of the error parameter is computed for each "additional" vertex V of the current cell ci, other than the initial vertex V0, and designated $V_l$, $V_m$, $V_n$, $V_{lm}$, $V_{ln}$, $V_{mn}$, $V_{lmn}$, $V_{lmn}$ being the vertex of a three-dimensional cell, opposite to the initial vertex, according to the following operations:

$$\text{Err}_{d\_xy}(V_l)=\text{Err}_{d\_xy}(V)-\Delta m$$

$$\text{Err}_{d\_xy}(V_m)=\text{Err}_{d\_xy}(V)+\Delta l$$

$$\text{Err}_{d\_xy}(V_{lm})=\text{Err}_{d\_xy}(V_l)+\Delta l$$

$$\text{Err}_{d\_yz}(V_m)=\text{Err}_{d\_yz}(V)-\Delta n$$

$$\text{Err}_{d\_yz}(V_n)=\text{Err}_{d\_yz}(V)+\Delta m$$

$$\text{Err}_{d\_yz}(V_{mn})=\text{Err}_{d\_yz}(V_m)+\Delta m$$

$$\text{Err}_{d\_xz}(V_n)=\text{Err}_{d\_xz}(V)-\Delta l$$

$$\text{Err}_{d\_xz}(V_l)=\text{Err}_{d\_xz}(V)+\Delta n$$

$$\text{Err}_{d\_xz}(V_{ln})=\text{Err}_{d\_xz}(V_n)+\Delta n$$

where $\Delta l=r\cdot(l_t-l_s)$, $\Delta m=r\cdot(m_t-m_s)$ and $\Delta n=r\cdot(n_t-n_s)$.

6. The method according to claim 1 wherein, in the course of step j, the listed cells correspond to the cells for which one of their vertices is associated with an error parameter value lying between a predefined minimum error value ($e_{min}$) and a predefined maximum error value ($e_{max}$).

7. The method according to claim 5, wherein the values of minimum and maximum error are dependent, for a given cell, on the distance between the initial vertex of this cell and said vertex S.

8. The method according to claim 1, wherein the coordinates of a point M in the discretized space are represented, on each axis of a frame, by an integer defined by a binary word of W bits, and in which a point M belongs to a cell of the occupancy grid, each cell being defined, for each axis of the frame by an integer index defined by a binary word of d bits, and in which W is greater than d and in which W and d are chosen such that $$d < W \le \frac{T+d-1}{2}$$

with T corresponding to the maximum number of bits that can be manipulated by an integer arithmetic unit used for the implementation of a multiplication operation to carry out said computation of the value of an error parameter E, in step e.

9. The method according to claim 1, wherein the coordinates of a point M in the discretized space are represented, on each axis of a frame, by an integer defined by a binary word of W bits, and in which the integer coordinates ($u_x$, $u_y$, $u_z$) of a point M are determined on the basis of spherical coordinates by computing the offset at the center of the frame K $$u_x-u_x^K=D\cdot T_x(\alpha,\omega)$$

$$u_y-u_y^K=D\cdot T_y(\alpha,\omega)$$

$$u_z-u_z^K=D\cdot T_z(\omega)$$

with D the distance of the target, $\alpha$ the longitude measured on the basis of the axis x, $\omega$ the latitude measured from the equatorial plane, and $T_x(\alpha, \omega)$, $T_y(\alpha, \omega)$ and $T_z(\omega)$ are precomputed tables of stored integer values defined by:

$$T_x(\alpha, \omega) = \frac{2^{W-1}\cdot\cos(\omega)\cdot\cos(\alpha)}{R}$$

$$T_y(\alpha, \omega) = \frac{2^{W-1}\cdot\cos(\omega)\cdot\sin(\alpha)}{R}$$

$$T_z(\omega) = \frac{2^{W-1}\cdot\sin(\omega)}{R}$$

R designates the maximum range of the sensor, $$u_x^K=2^{W-1}$$

$$u_y^K=2^{W-1}$$

$$u_z^K=2^{W-1}.$$

10. The method according to claim 1, wherein for a grid of side 2R, the information of sensors which are outside of the sphere of radius R are filtered before executing the steps of the method.

11. The method according to claim 9, wherein the values of the aforementioned tables are normalized by a value $D_{max}=\sqrt{2}\cdot R$ in 2 dimensions and $D_{max}=\sqrt{3}\cdot R$ in 3 dimensions.

12. A device for determining the coordinates of cells $c_i$ liable to be traversed in an observation space represented by a grid G having a first resolution stepsize, a cell being represented by vertices and sides or segments connecting these vertices, comprising:
- one or more sensors suitable for measuring the coordinates of a point measured in the grid resolution stepsize situated at a distance from the target F,
- a module for discretizing the measured coordinates with a spatial resolution stepsize δ which is smaller than the grid resolution stepsize $R_G$,
- a module for processing the discretized coordinates suitable for executing the steps of the method according to claim 1.

13. The device according to claim 12, wherein the observation space is defined by a sensor onboard a moving vehicle and wherein a selected cell is filled by a value of probability of occupancy by an obstacle.

14. The method according to claim 2, wherein the occupancy grid is defined in 2 dimensions and in which, the error function $\text{Err}_d(M)$ is defined by:

$$\text{Err}_d(M) = (m-m_s)\cdot(l_F-l_s) - (l-l_s)\cdot(m_F-m_s),$$

and wherein, in the course of step f, a value of the error parameter is computed for each "additional" vertex V of the current cell ci, other than the initial vertex V0, and designated $V_l$, $V_m$ and $V_{lm}$, $V_{lm}$ being the vertex opposite to the initial vertex, according to the following operations:

$$\text{Err}_d(V_l) = \text{Err}_d(V) - \Delta m$$

$$\text{Err}_d(V_m) = \text{Err}_d(V) + \Delta l$$

$$\text{Err}_d(V_{lm}) = \text{Err}_d(V_l) + \Delta l$$

where $\Delta l = r\cdot(l_F-l_S)$ and $\Delta m = r\cdot(m_F-m_S)$.

15. The method according to claim 14, wherein during step g, by comparing the sign of the computed errors, the next cell traversed, is determined in the following manner:
   If $\text{Err}_d(V_{lm}) = 0$, then the cell ci+1 corresponds to the cell having an initial vertex corresponding to $V_{lm}$ and the error parameter E associated with this new initial vertex is equal to $\text{Err}_d(V_{lm})$,
   If $\text{Err}_d(V_{lm})$ and $\text{Err}_d(V_l)$ are of opposite signs, then the cell ci+1 corresponds to the cell having an initial vertex corresponding to $V_l$ and the error parameter E associated with this new initial vertex is equal to $\text{Err}_d(V_l)$,
   Otherwise the cell $c_{i+1}$ corresponds to the cell having an initial vertex corresponding to Vim and the error parameter E associated with this new initial vertex is equal to $\text{Err}_d(V_m)$.

* * * * *